United States Patent
Abrahamian et al.

(10) Patent No.: US 11,710,081 B2
(45) Date of Patent: Jul. 25, 2023

(54) MACHINE LEARNING TELECOMMUNICATION NETWORK SERVICE FRAUD DETECTION

(71) Applicant: AT&T Intellectual Property I, L.P., Atlanta, GA (US)

(72) Inventors: Edmond J. Abrahamian, Richmond Heights, MO (US); Ana Armenta, San Jose, CA (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 331 days.

(21) Appl. No.: 16/894,675

(22) Filed: Jun. 5, 2020

(65) Prior Publication Data

US 2021/0383393 A1     Dec. 9, 2021

(51) Int. Cl.
*G06N 20/20*     (2019.01)
*G06Q 20/40*     (2012.01)
*G06N 20/00*     (2019.01)
*G06F 18/214*    (2023.01)
*G06F 18/243*    (2023.01)
*G06Q 40/03*     (2023.01)

(52) U.S. Cl.
CPC ........... *G06N 20/20* (2019.01); *G06F 18/214* (2023.01); *G06F 18/24323* (2023.01); *G06N 20/00* (2019.01); *G06Q 20/4016* (2013.01); *G06Q 40/03* (2023.01)

(58) Field of Classification Search
CPC ................................................. G06Q 20/4016
USPC ....................................................... 705/75
See application file for complete search history.

(56) References Cited

U.S. PATENT DOCUMENTS

| 10,510,078 B2 * | 12/2019 | Le ........................ G06Q 20/401 |
| 2010/0094791 A1 * | 4/2010 | Miltonberger ......... G06Q 10/10 706/46 |
| 2012/0209773 A1 * | 8/2012 | Ranganathan ..... G06Q 20/3224 705/44 |

(Continued)

FOREIGN PATENT DOCUMENTS

CA            3038728 A1 *  4/2018  ............. G06Q 20/20

OTHER PUBLICATIONS

Towards Data Science, "Basic Ensemble Learning (Random Forest, AdaBoost, Gradient Boosting)-Step by Step Explained", Jan. 2, 2019, pp. 1-10, https://towardsdatascience.com/basic-ensemble-learning-random-forest-adaboost-gradient.

*Primary Examiner* — Lindsay M Maguire

(57) ABSTRACT

A processing system may obtain a customer identifier at a first retail location of a telecommunication network service provider, determine a recency factor of the identifier, obtain an identification of items of interest to the customer, and determine whether the customer has visited a second retail location of the provider within a time period prior to the customer being at the first retail location. The processing system may then apply, to a fraud detection machine learning model, a plurality of factors comprising: a quantity of items of interest, a value of the items, a factor associated with whether the customer has visited the second retail location within the time period, and the recency factor, where the fraud detection machine learning model outputs a fraud indicator value, determine that the fraud indicator value meets a warning threshold and present a warning to a device at the first retail location.

20 Claims, 4 Drawing Sheets

(56) References Cited

U.S. PATENT DOCUMENTS

| | | | |
|---|---|---|---|
| 2015/0066651 A1* | 3/2015 | Hu | G06Q 20/20 705/16 |
| 2018/0096330 A1* | 4/2018 | Hamilton | G06Q 20/20 |
| 2018/0181939 A1* | 6/2018 | Hamilton | G06Q 20/322 |

* cited by examiner

MACHINE LEARNING TELECOMMUNICATION NETWORK SERVICE FRAUD DETECTION

The present disclosure relates generally to machine learning model deployment, and more particularly to methods, computer-readable media, and apparatuses for presenting a warning when a fraud indicator value output from a fraud detection machine learning model that processes factors associated with a customer transaction at a retail location of a telecommunication service provider meets a warning threshold.

BACKGROUND

Machine learning in computer science is the scientific study and process of creating algorithms based on data that perform a task without any instructions. These algorithms are called models and different types of models can be created based on the type of data that the model takes as input and also based on the type of task (e.g., prediction, classification, or clustering) that the model is trying to accomplish. The general approach to machine learning involves using the training data to create the model, testing the model using the cross-validation and testing data, and then deploying the model to production to be used by real-world applications.

SUMMARY

In one example, the present disclosure describes a method, computer-readable medium, and apparatus for presenting a warning when a fraud indicator value output from a fraud detection machine learning model that processes factors associated with a customer transaction at a retail location of a telecommunication service provider meets a warning threshold. For instance, in one example, a processing system including at least one processor may obtain at least one identifier of a customer at a first retail location of a telecommunication network service provider, determine a recency factor of the at least one identifier, obtain an identification of one or more items of interest to the customer, and determine whether the customer has visited at least a second retail location of the telecommunication network service provider within a first predefined time period prior to the customer being at the first retail location. The processing system may then apply, to a fraud detection machine learning model, a plurality of factors comprising: a quantity of the one or more items of interest, a total value of the one or more items of interest, a factor associated with whether the customer has visited at least the second retail location within the first predefined time period, and the recency factor of the at least one identifier of the customer, where the fraud detection machine learning model outputs a fraud indicator value. Next, the processing system may determine that the fraud indicator value meets a warning threshold and present a warning to a device at the first retail location when it is determined that the fraud indicator value meets the warning threshold.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
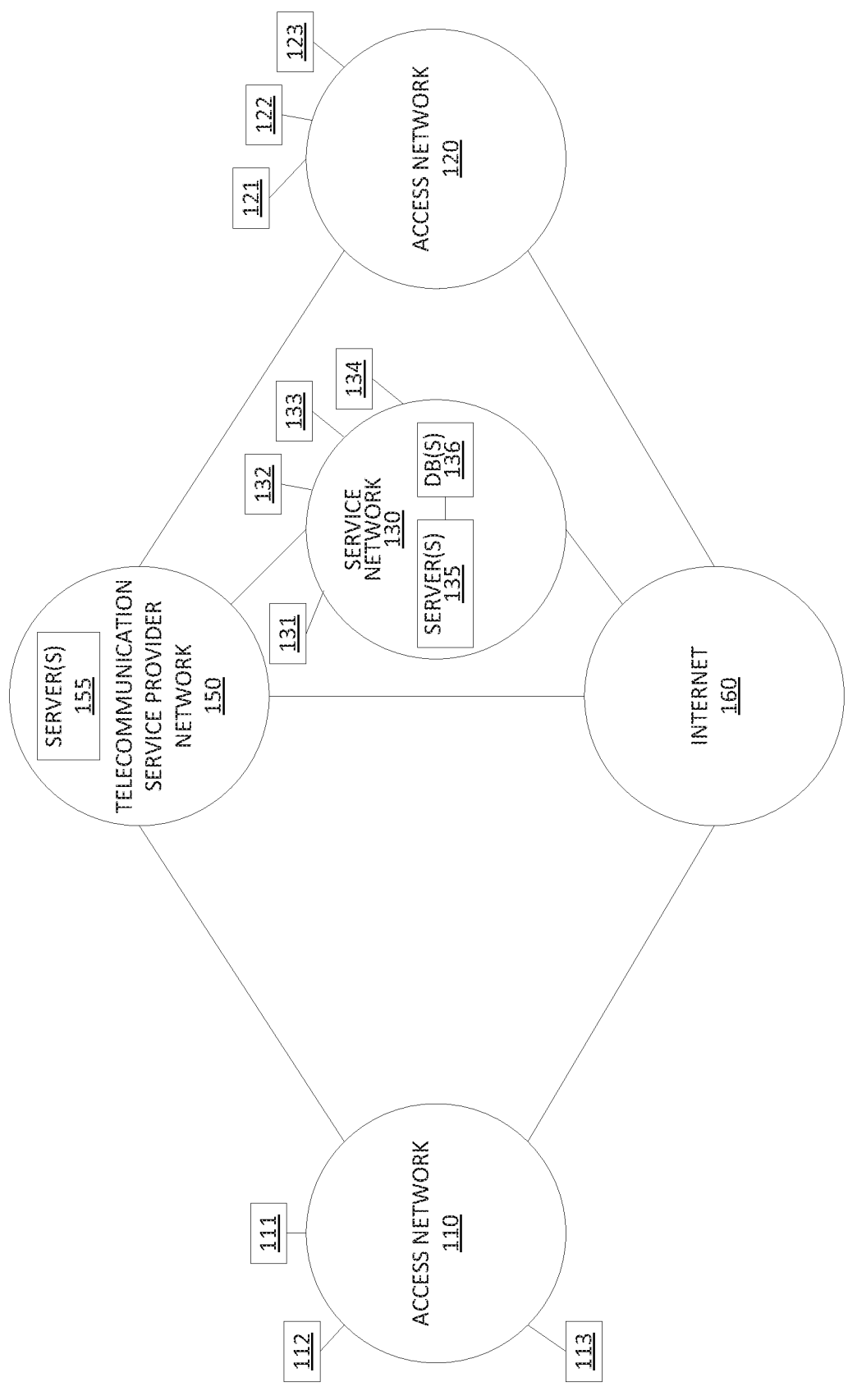
FIG. 1 illustrates one example of a system related to the present disclosure.

The present disclosure broadly discloses methods, non-transitory (i.e., tangible or physical) computer-readable storage media, and apparatuses for presenting a warning when a fraud indicator value output from a fraud detection machine learning model that processes factors associated with a customer transaction at a retail location of a telecommunication service provider meets a warning threshold. Telecommunication service providers may have large retail distribution channels, and may have frequent attempts of fraudulent purchases from physical stores. Examples of the present disclosure detect these fraudulent purchases, by providing a propensity (probability) of fraud for each occurrence (broadly, a "fraud score"). In particular, examples of the present disclosure include training a machine learning model (MLM), e.g., a fraud detection model, such as a gradient boosted machine (GBM), that outputs a fraud indicator value, where the MLM comprises a plurality of independent variables associated with the plurality of factors and a dependent variable comprising the fraud indicator value. In accordance with the present disclosure, the plurality of factors includes those that may be obtained via the telecommunication network service provider network, including: geo-temporal features (e.g., which stores were visited by a customer, the distance between stores when the customer created or revised their shopping cart), a cart size (e.g., a total number, or quantity of items in a "shopping cart"), a count of particular items of interest (e.g., how many phones of a particular make and model), type(s) of items of interest (e.g., a category, or categories of the items, such as whether smart phones of interest are the latest, most recently released model(s)), price (which may include the overall value of items in the "shopping cart," the value of the most expensive item in the "shopping cart," etc.), desirability (e.g., whether the item(s) is/are the most popular or most expensive at the time, such as the current most expensive smart phone, the current most expensive wearable computing device, etc.), and so forth.

In one example, the plurality of factors may include information derived from call detail records (CDRs) of the telecommunication network. For instance, when a customer provides a phone number as additional identification in connection with a transaction at a retail location, the present disclosure may obtain information regarding a level of utilization of the phone number. For example, the CDRs include records of caller and callee phone numbers, as long as one party to the call is a subscriber of the telecommunication network service provider. For a large telecommunication network service provider, the CDRs will include all calls for a phone number associated with a subscriber within a time range over which the CDRs are stored. In addition, for a non-subscriber phone number, the CDRs may still include a number of CDRs relating to the non-subscriber phone number, assuming "normal" usage. For instance, a non-fraudulent, non-subscriber user having a phone number is still likely to have a significant number of calls involving other parties who are already subscribers of the telecommunication network service provider. In any case, a low number of calls involving a phone number (as determined from the CDRs) although not a dispositive factor, may be associated with a fraudulent intent. In one example, the factors of the gradient boosted machine may include whether or not the phone number is of a current subscriber, and may have separate factors for CDR call volume for current subscribers and non-subscribers, respectively.

In one example, the plurality of factors (also referred to as "features" or "descriptors") may also include information regarding the temporary or transient usage of resources (e.g., port-in number history and usage or the use of burner phones). In addition, in one example, the present disclosure may collect information from a device at a retail location (e.g., a device utilized by in-store personnel) pertaining to common utterances of customers determined to be involved in fraud. Specifically, the present disclosure may include a compiled list of utterances correlated with fraudulent cases. For instance, a user with fraudulent intent may be more likely to ask "how many free phone upgrades can I get?" as compared to "I'd like to upgrade the two phones on my account." For example, the first question may be indicative that the customer is not actually the owner of the account for which he or she is attempting to obtain upgraded phones. In another example, a user with fraudulent intent may ask "how many lines do I qualify for?", when applying for a new account, as compared to "I need two phone lines", in an attempt to maximize the number, or quantity of devices that can be had.

The plurality of factors may also relate to third party information, such as credit worthiness/credit score, recency of contact information, and so forth. In accordance with the present disclosure, recency of contact information may include when an email address was created, and therefore how long the email address has been in use, and may alternatively or additionally include information regarding whether and to what extent the same email address has been provided in connection with other transactions with third parties (including purchasing of goods or services, account creation, signing up for rewards or newsletters, etc.). In one example, recency information regarding a customer-provided phone number may also be obtained from an account management system of the telecommunication network service provider, or from one or more third-parties, such as another telecommunication network service provider, a merchant (e.g., where the phone number is provided in connection with a different transaction with such a third party merchant), and so on.

Based on a predefined threshold, the present disclosure may determine whether the output of the MLM (e.g., a "propensity" or fraud score) is high enough to prevent the completion of a transaction at a retail location between a customer and the telecommunication network service provider involving one or more items of interest. For instance, the present disclosure may comprise presenting a warning to a device at the first retail location when it is determined that the fraud indicator value meets the warning threshold, where the warning indicates a need to prevent a completion of a transaction between the customer and the telecommunication network service provider involving one or more items. In one example, the present disclosure may alternatively or additionally include directing a further investigation or directing the customer to provide additional proof of identity and/or additional verification of intended method of payment (e.g., verifying ownership of credit card account, bank account, etc. and/or verifying sufficient funds, allowing the transaction to proceed if an alternate method of payment is utilized, such as bank check, cashier's check, etc., and so on).

It should be noted that as referred to herein, a machine learning model (MLM) (or machine learning-based model) may comprise a machine learning algorithm (MLA) that has been "trained" or configured in accordance with input data (e.g., training data) to perform a particular service, e.g., to detect fraud and/or to provide a fraud indicator, or value indicative of a likelihood of fraud. Examples of the present disclosure may incorporate various types of MLAs/models that utilize training data, such as support vector machines (SVMs), e.g., linear or non-linear binary classifiers, multi-class classifiers, deep learning algorithms/models, such as deep learning neural networks or deep neural networks (DNNs), generative adversarial networks (GANs), decision tree algorithms/models, k-nearest neighbor (KNN) clustering algorithms/models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. In one example, a fraud detection MLM of the present disclosure may be in accordance with a MLA/MLM from an open source library, such as OpenCV, which may be further enhanced with domain specific training data. In an illustrative example, a fraud detection machine learning model of the present disclosure may comprise a gradient boosted machine (GBM) as described in greater detail below. These and other aspects of the present disclosure are discussed in greater detail below in connection with the examples of FIGS. 1-4.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or system, such as computing system 400 depicted in FIG. 4, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices (e.g., subscriber/customer devices) and/or one or more servers of one or more third parties, such as a credit bureau, a payment processing service (e.g., a credit card company), an email service provider, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth.

In the example of FIG. 1, service network 130 may include one or more servers 135 which may each comprise all or a portion of a computing device or processing system, such as computing system 400, and/or a hardware processor element 402 as described in connection with FIG. 4 below, specifically configured to perform various steps, functions, and/or operations for presenting a warning when a fraud indicator value output from a fraud detection machine learning model that processes factors associated with a customer transaction at a retail location of a telecommunication service provider meets a warning threshold, as described herein. For example, one of the server(s) 135, or a plurality of servers 135 collectively, may perform operations in connection with the example architecture 200 of FIG. 2 and/or the example method 300 of FIG. 3, or as otherwise described herein. In one example, the one or more of the servers 135 may comprise an MLM-based service platform (e.g., a network-based and/or cloud-based service hosted on the hardware of servers 135).

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for presenting a warning when a fraud indicator value output from a fraud detection machine learning model that processes factors associated with a customer transaction at a retail location of a telecommunication service provider meets a warning threshold, as described herein. As just one example, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, and other information and statistics, which may then be compiled and processed, e.g., normalized, transformed, tagged, etc., and forwarded to DB(s) 136, via one or more of the servers 135.

In one example, DB(s) 136 may be configured to receive and store records from customer, user, and/or subscriber interactions, e.g., with customer facing automated systems and/or personnel of a telecommunication network service provider (e.g., the operator of telecommunication service provider network 150). For instance, DB(s) 136 may maintain call logs and information relating to customer communications which may be handled by customer agents via one or more of the devices 131-134. For instance, the communications may comprise voice calls, online chats, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc. Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems. The records may be of the same or a similar nature as any records that may be stored regarding communications that are handled by a live agent.

Similarly, any one or more of devices 131-134 may comprise a device deployed at a retail location that may service live/in-person customers. In such case, the one or more of devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In this regard, any one or more of devices 111-113 or 121-123 may comprise a device deployed at a retail location that may service live/in-person customers and that may generate and forward customer interaction records to DB(s) 136. For instance, such a device (e.g., a "personnel device") may comprise a tablet computer in which a retail sales associate may input information regarding a customer and details of the transaction, such as identity and contact information provided by the customer (e.g., a name, phone number, email address, mailing address, etc.), desired items (e.g., physical items, such as smart phones, phone cases, routers, tablet computers, laptop computers, etc., or service items, such as a new subscription or a subscription renewal, a type of subscription (e.g., prepaid, non-prepaid, etc.), an agreement duration (e.g., a one-year contract, a two-year contract, etc.), add-on services (such as additional data allowances, international calling plans, and so forth), discounts to be applied (such as free phone upgrades and/or subsidized phone upgrades, special group discounts, etc.), and so on. In such case, information entered and/or obtained via such personnel devices may be forwarded to server(s) 135 and/or DB(s) 136 for processing and/or storage. As such, DB(s) 136, and/or server(s) 135 in conjunction with DB(s) 136, may comprise a retail inventory management knowledge base. In addition, DB(s) 136 and/or server(s) 135 in conjunction with DB(s) 136 may comprise an account management system. For instance, information regarding subscribers' online and in-store activities may also be included in subscriber account records (e.g., in addition to contact information, payment information, information on current subscriptions, authorized users, duration of contract, etc.).

In one example, DB(s) 136 may alternatively or additionally receive and store data from one or more third parties. For example, one or more of endpoint devices 111-113 and/or 121-123 may represent a server, or servers, of a consumer credit entity (e.g., a credit bureau, a credit card company, etc.), a merchant, or the like. In such an example, DB(s) 136 may obtain one or more data sets/data feeds comprising information such as: consumer credit scores, credit reports, purchasing information and/or credit card payment information, credit card usage location information, and so forth. In one example, one or more of endpoint devices 111-113 and/or 121-123 may represent a server, or servers, of an email service provider, from which DB(s) 136 may obtain email address service information (e.g., high-level information, such as the date the email address was created and or an age or approximate age of the email address since it was created, a mailing address and/or phone number (if any) that is associated with the email address (and if the third party is permitted to provide such information in accordance with the email address owner's permissions). Such information may then be leveraged in connection with email addresses that may be provided by customers during in-person transactions at telecommunication network service provider retail locations. Similarly, one or more of endpoint devices 111-113 and/or 121-123 may represent a server, or servers, of one or more merchants or other entities (such as entities providing ticketed sporting events and/or concerts, email mailing lists, etc.), from which DB(s) 136 may obtain additional email address information (e.g., email address utilization information).

In one example, DB(s) 136 may also store training data and/or testing data that may be used to train and verify the accuracy of a MLM for fraud detection (broadly, a "fraud detection machine learning model") as described herein. For instance, sets of inputs (e.g., factors/features) relating to in-person transactions at a retail location of a telecommunication network service provider may be stored in connection with the associated predictions (fraud scores). In addition, labels may be added to at least a portion of the stored sets of input factors (e.g., labels of "fraud" or "no fraud") as stored in DB(s) 136. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

Operations of server(s) 135 for presenting a warning when a fraud indicator value output from a fraud detection machine learning model that processes factors associated with a customer transaction at a retail location of a telecommunication service provider meets a warning threshold, and/or server(s) 135 in conjunction with one or more other devices or systems (such as DB(s) 136) are further described below in connection with the examples of FIGS. 2 and 3. In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

Figure 2:
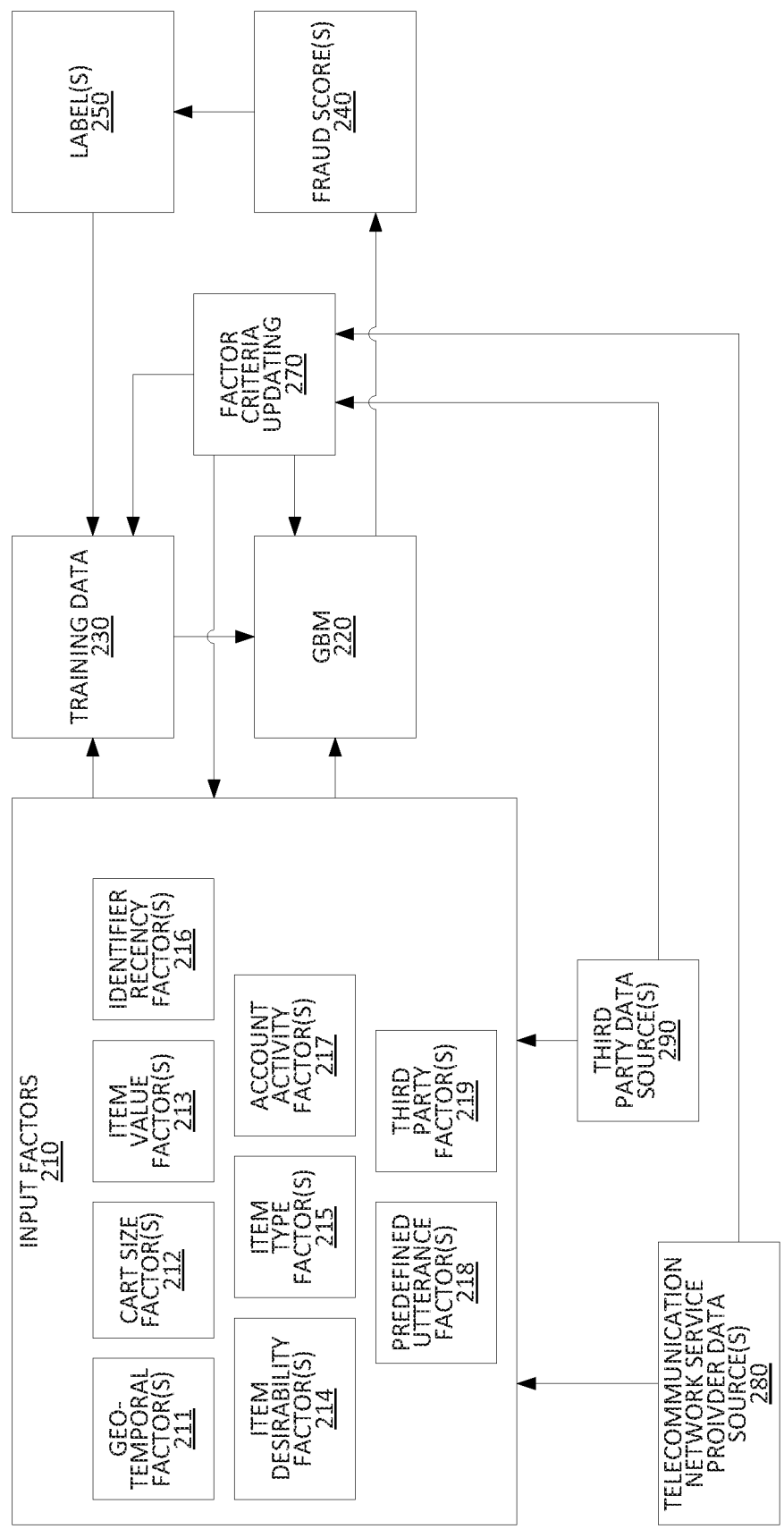
FIG. 2 illustrates an example architecture for machine learning model-based fraud detection for telecommunication network service provider retail store customer transactions, in accordance with the present disclosure.

FIG. 2 illustrates an example architecture 200 for machine learning model-based fraud detection for telecommunication network service provider retail store customer transactions, in accordance with the present disclosure. In one example, the architecture 200 may be implemented via a processing system comprising one or more physical devices and/or components thereof, such as a server or a plurality of servers, a database system, and so forth. For instance, various aspects of the architecture 200 may be provided via components as illustrated FIG. 1, including server(s) 135 and/or DB(s) 136, server(s) 155, endpoint devices 111-113, 121-123, devices 131-134, etc.

As shown in FIG. 2, the architecture 200 includes inputs from one or more telecommunication network service provider data sources 280, such as one or more data storage systems comprising a CDR database, a customer account database, a retail inventory management knowledge base, devices at retail locations of the telecommunication network service provider (e.g., "personnel devices"), etc. Similarly, the architecture 200 includes inputs from one or more third party data sources 290, such as credit bureaus providing credit score data, email service providers providing email address account information and usage information, merchants or other entities providing email address and/or phone number usage information (e.g., from various purchases of customers with such merchants, etc.), and so forth.

As further illustrated in FIG. 2, the architecture 200 may include assembling data from telecommunication network service provider data source(s) 280 and third party data source(s) 290 into a plurality of input factors 210. For instance, the input factors 210 may include one or more geo-temporal factors 211, one or more cart size factors 212, one or more item value factors 213, one or more item desirability factors 214, one or more item type factors 215, one or more identifier recency factors 216, one or more account activity factors 217, one or more predefined utterance factors 218, and one or more third party factors 219. The geo-temporal factor(s) 211 may include information that quantifies which stores a customer visited, the distance between stores (e.g., when a customer has visited two or more stores in connection with a same transaction, or different transactions within a given time duration (e.g., within the same week, within the same month, etc.)). The cart size factor(s) 212 may comprise an indicator of a total number, or quantity of items in a "shopping cart" that is created for a customer. Insofar as the present disclosure relates to fraud detection for telecommunication network service provider retail locations, the "shopping cart" may be maintained as a list that is input via a device (e.g., of in-store personnel of the telecommunication network service provider). The cart size factor(s) 212 may also include counts of particular items of interest (e.g., how many phones of a particular make and model are in the "shopping cart"). It should again be noted that the items of interest may include physical items as well as service items.

The item value factor(s) 213 may comprise prices (which may include the overall value of items in the "shopping cart," the value of the most expensive item in the "shopping cart," etc.). The item desirability factor(s) 214 may include indicators of whether the item(s) is/are the most popular or most expensive at the time within a particular category, such as the current most expensive smart phone, the current most expensive wearable computing device, a current most expensive subscription package, etc. (or within the top N items within a particular category in terms of value, such as within the top three most expensive phones, etc.). The item type factor(s) 215 may include type(s) of items of interest (e.g., a category, or categories of the items). The item type factor(s) 215 may also include one or more indicators of whether items of interest are the latest, most recently released model(s) (e.g., for physical items in the "shopping cart").

The identifier recency factor(s) 216 may include information regarding the recency of contact information, such as when a customer-provided email address was created, and therefore how long the email address has been in use, and may alternatively or additionally include information regarding whether and to what extent the same email address has been provided in connection with other transactions with third parties (including purchasing of goods or services, account creation, signing up for rewards or newsletters, etc.). Another example is how long the customer has resided at an address of a residence.

In one example, recency factor(s) 216 may include information regarding a customer-provided phone number that may be obtained from telecommunication network service provider data source(s) 280 (such as an account management system of the telecommunication network service provider), or from one or more third parties, such as another telecommunication network service provider, a merchant (e.g., where the phone number is provided in connection with a different transaction with such a third party merchant), and so on. It should also be noted that in one example, the item value factor(s) 213, the item desirability factor(s) 214, and the item type factor(s) 215 may comprise aggregate information combining information from telecommunication network service provider data source(s) 280 and third party data source(s) 290. For instance, for one of the item value factor(s) 213 that may relate to a price of a particular phone make and model, the price/value of the item may be averaged from the overall sale prices for the particular phone make and model from direct sales by the telecommunication network service provider as well as sales of the same make and model of phone through third party channels.

The account activity factor(s) 217 may include information regarding account activity associated with one or more identifiers of a customer. For instance, account activity may include adding a line to the account, porting a phone number to the account, upgrading a physical device associated with the account, adding a physical device associated with the account, removing an association of a physical device with the account, or adding an authorized user to the account. Thus, for example, each one of these types of activities may have an associated factor that may indicate whether or not the activity has occurred with respect to the account within a predefined time period prior to a current in-person visit to a retail location of the telecommunication network service provider (e.g., within the past three days, the past week, the past two weeks, the past month, etc.). For instance, one or more of such factors may comprise binary factors (e.g., yes or no, with respect to whether the activity has occurred). In one example, such factors may accommodate a range of values such as from 0 to 14, indicating whether such an activity has occurred (e.g., zero indicating that the activity did not occur within the predefined time period prior to the in-person visit to the retail location, or 1-14, indicating how many days prior to the current in-person visit the account activity occurred, e.g., 1 being at a prior time on the same day, 2 being the immediately prior day, etc.). It should be noted that other data formats of the same or a similar nature may be utilized in various examples.

The predefined utterance factor(s) 218 may include indicators of whether or not a customer has spoken certain predefined utterances in discussions with in-store personnel of the telecommunication network service provider. For instance, a retail associate at the store may utilize a device, such as a tablet computer, when assisting the customer and may use the device to input desired items the customer has indicated he or she would like to purchase, obtain, subscribe to, etc. In addition, the device may also provide a tactile/visual interface that enables the retail associate to enter selections regarding specific predefined utterances (or words to the same effect) that may be spoken by the customer, such as "how many free phones can I get?" In one example, a list of predefined utterances may be selected by other personnel of the telecommunication network service provider (such as loss prevention experts) who may devise a list of the predefined utterances based upon interviews with retail personnel regarding past cases of fraud and certain patterns of speaking that may have a prevalence of use by fraudulent customers.

The third party factor(s) 219 may include a credit worthiness/credit score factor, one or more recency of contact information factors (dates of creation and/or times since creation of email addresses, dates and/or times since last assignment of a telephone numbers (e.g., by another telecommunication network service provider, an mobile virtual network operator (MVNO), etc.) email address and/or telephone number usage in connection with transactions with third party merchants or other entities), and so forth. It should be noted that in one example, all or a portion of the information obtained from third party data source(s) 290 may be incorporated into other factors as noted above (e.g., item value factor(s) 213, item desirability factor(s) 214, and/or identifier recency factor(s) 216). However, in another example, information obtained from third party data source(s) 290 that may be the same as or similar to information obtained from telecommunication network service provider data source(s) 280 may nevertheless be provided distinct factors (e.g., and referred to as third party factor(s) 219). For instance, in one example, identifier recency factor(s) may aggregate information from both of telecommunication network service provider data source(s) 280 and third party data source(s) 290, while in another example, information regarding recency of email addresses and/or phone numbers obtained from telecommunication network service provider data source(s) 280 may be included in identifier recency factor(s) 216 and information regarding recency of email addresses and/or phone numbers obtained from third party data source(s) 290 may have one or more separate factors that may be included in third party factor(s) 219.

In one example, the architecture 200 may include data preprocessing in connection with the formation of the input factors 210, such as data filtering, transformation, aggregation, and so forth. In addition, the input factors 210 may be organized and grouped on a per-transaction basis. In one example, the architecture 200 may also include factor criteria updating 270 based upon information from telecommunication network service provider data source(s) 280 and/or third party data source(s) 290. For instance, as noted above, one of the item desirability factor(s) 214 may be an indicator of whether or not a particular item in a "shopping cart" is a current most expensive make and model (e.g., the current most expensive mobile smartphones). For instance, the factor may be a binary input variable for gradient boosted machine (GBM) 220 indicating "yes" or "no" with regard to this criteria. However, since the most popular mobile smartphone may change over time, the evaluation criteria for this factor may be updated, e.g., when the data from telecommunication network service provider data source(s) 280 indicates that the most popular item has changed. In one example, the indication of the change may be specifically provided from the telecommunication network service provider data source(s) 280. In another example, the architecture 200 may include determining factor criteria changes as part of the factor criteria updating 270. It should also be noted that in one example, factor criteria updating 270 may include changes to factor criteria that may be manually provided by personnel of the telecommunication network service provider.

Architecture 200 further comprises a gradient boosted machine (GBM) 220, which is trained for and operates to output fraud scores regarding customer transactions at retail locations of the telecommunication network service provider. The GBM 220 may initially be trained with training data 230 (which is referred to herein may also include "testing" data that is used for verification of accuracy, or the like). For instance, the training data may include input factors 210 for various customer transactions which may be labeled, e.g., with labels 250 that may be obtained for past customer transactions for which an indicator of fraud or no fraud may be applied. For example, loss prevention personnel may investigate a sampling of customer transactions at some point in the future after such transactions are completed, and may provide manual labels of "fraud" or "no fraud." In one example, the sets of input factors 210 for customer transactions involving known fraud may be manually labeled as such, while the sets of input factors 210 for customer transactions that are not known to involve fraud may be automatically labeled "no fraud" (and/or default labels of "no fraud" may be applied to these sets of input factors 210).

The GBM 220 may comprise a plurality of independent variables (e.g., input factors 210) and a dependent variable (e.g., the output/prediction, which in accordance with the present disclosure comprises a fraud score). Insofar as the input factors 210 of the present example are predefined, the GBM 220 is an example of supervised machine learning (ML). However, the training of the GBM 220 involves a "boosting" process that learns relative importance of the different input factors 210 and which generates a plurality of decision trees accordingly. For instance, in gradient boosting, a first decision tree may be trained and then a residual error may be detected. A second decision tree may be trained in accordance with the residual error, and so on. The number of trees created may be predefined (e.g., 10 trees, 50 trees, 100 trees, 200 trees, etc.) or may be reached when the residual error is below a predefined threshold, e.g., less than 15 percent, less than 10 percent, etc. The number of trees and/or the predefined threshold may be selected by an operator of the telecommunication network service provider in view of any number of criteria, such as time and/or resources to train, a business judgement regarding a tolerability of false positives and/or missed fraudulent cases, a desire to avoid overfitting, etc. Similarly, the tree depth may be a configurable parameter of GBM 220, for instance a tree depth of 3, 5, 7, 10, etc. may be selected. In addition, a maximum number of nodes (including leaves) may be selected as a configurable parameter. Thus, while there may a larger number of input factors 210 from which to select, for each tree that is created, a lesser number of factors may be selected as observations in the tree (e.g., nodes and/or leaves). Other tunable parameters may be the loss improvement that is required in order to add a decision node (add a split to a tree), and so on.

In one example, each tree may be generated from the same training data 230. In another example, each tree may be generated from randomly sampled data from a same pool of the training data 230. In addition, the accuracy of the GBM 220 may be calculated and improved using out-of-bag testing, bootstrap aggregating (bagging), cross validation, or the like. For instance, as each tree is created, the accuracy of the GBM 220 may be recalculated using the same or different testing data (e.g., from the training data 230). Thus, trees may be added to the GBM 220 as the accuracy continues to improve and/or until a maximum number of trees in reached. It should also be noted that the GBM 220, as deployed and in operation for fraud detection in a production environment, may also continue to be tested. The GBM 220 may be retrained periodically with new training data 230 and/or when the accuracy of the GBM 220 is observed to decline below a threshold (e.g., a threshold accuracy and/or a threshold decline from an accuracy since last retraining, etc.). For instance, the GBM 220 may be retrained when the accuracy falls below 75 percent, 70 percent, etc. For example, as new items become more popular or have been in the market for longer, as items are discounted, as promotional offers take effect, and so forth, circumstances may change such that the patterns in the input factors 210 that are most indicative of fraud will also dynamically change.

The GBM 220, in accordance with gradient boosting techniques, may output a value (e.g., the independent variable), which in the present example, comprises a fraud score (e.g., one of fraud score(s) 240). In one example, the GBM 220 may operate as a binary classifier and may be trained as such (in other words, the output fraud score(s) 240 may be one of two values indicating "fraud" or "no fraud"). In another example, the dependent variable (the output/fraud score(s) 240) may take a number of discrete values, or a range of continuous values indicative of fraud. As such, GBM 220 may comprise an ensemble of classification trees or regression trees, in respective examples. Thus, the fraud score(s) 240 may each comprise a percent or number that indicates the likelihood, or the relative likelihood that a particular customer transaction may be potentially fraudulent (e.g., a higher score may be more indicative of fraud, while not actually constituting a percentage likelihood). It should be noted that in accordance with gradient boosting techniques, the fraud score(s) 240 may be assembled from the predictions of each of the decision trees constituting the trained GBM 220. In one example, based upon post-observations (e.g., labeling), the GBM 220 may learn a percentage likelihood of fraud that may be mapped to the dependent variable/output value. In such case, the output of GBM 220 may comprise a translated fraud score. Thus, fraud score(s) 240 may comprise predictions of a percentage likelihood of fraud.

In one example, the fraud score(s) 240 may be provided to devices at retail locations (e.g., to the personnel devices being used by in-store retail associates serving customers in connection with particular customer transactions, to devices being used by supervisors or managers, etc.). Alternatively, or in addition, warnings or instructions may be transmitted to such devices for customer transactions for which fraud is indicated. For instance, in accordance with GBM 220 comprising a binary classifier, where the output indicates "fraud," a warning or instruction may be provided. In accordance with GBM 220 employing classification trees having more diverse output values and/or regression trees, a warning or instruction may be provided when one of the fraud score(s) 240 exceeds a predefined threshold (e.g., indicating a likelihood of fraud greater than 50 percent, greater than 75 percent, etc.). For example, the instruction may indicate to the retail associate that he or she is not authorized to complete the transaction, that the retail associate is to direct the customer to a supervisor who may engage in additional verification of the customer identity and/or intended method of payment, and so forth.

The application of labels 250 to the training data 230 is discussed above. In addition, in one example, the training data 230 may be specifically weighted such that sampling of the training data 230 for actual use in training the GBM may favor examples for which the predictions/fraud score(s) 240 were incorrect according to the labels. For instance, if one of the fraud score(s) 240 is provided that is determined to exceed a threshold indicative of fraud, but the label indicates that there was no fraud, the associated input factors 210 (along with the label) may preferentially be used for additional training of the GBM 220.

It should be noted that architecture 200 is just one example logical arrangement that may be implemented via a processing system in accordance with the present disclosure. Accordingly, it should be understood that the features described in connection with FIG. 2 may include alternative or additional arrangements in accordance with the present disclosure. For instance, in other, further, and different examples, alternative machine learning models for fraud detection may be deployed in place of GBM 220, such as a DNN, an SVM, a GAN, and so forth. In addition, it should be understood that other aspects of a processing system implementing the architecture 200 may be omitted from illustration in FIG. 2. As just one example, the architecture 200 may include a data distribution platform for obtaining sets/streams from telecommunication network service provider data source(s) 280 and third party data source(s) 290, such as Apache Kafka, or the like. The architecture 200 may also incorporate in-stream processing, such as preprocessing of the data comprising input factors 210 from telecommunication network service provider data source(s) 280 and third party data source(s) 290. For example, the architecture 200 may be deployed on or more instances of Apache Flink, or the like, as part of and/or in association with the Kafka streaming platform. Similarly, input factors 210, training data 230, and so forth may be stored in a distributed data storage platform. In addition, the GBM 220 (or other fraud detection MLM in accordance with the present disclosure) itself may be trained within and/or may operate on such a platform. For instance, the architecture 200 may comprise an instance of Apache Spark, e.g., on top of Hive and Hadoop Distributed File System (HDFS), or similar arrangement. Thus, these and other aspects are all contemplated within the scope of the present disclosure.

Figure 3:
FIG. 3 illustrates a flowchart of an example method for presenting a warning when a fraud indicator value output from a fraud detection machine learning model that processes factors associated with a customer transaction at a retail location of a telecommunication service provider meets a warning threshold.

FIG. 3 illustrates an example flowchart of a method 300 for presenting a warning when a fraud indicator value output from a fraud detection machine learning model that processes factors associated with a customer transaction at a retail location of a telecommunication service provider meets a warning threshold. In one example, steps, functions, and/or operations of the method 300 may be performed by a device as illustrated in FIG. 1, e.g., one of servers 135. Alternatively, or in addition, the steps, functions and/or operations of the method 300 may be performed by a processing system collectively comprising a plurality of devices as illustrated in FIG. 1 such as one or more of server(s) 135, DB(s) 136, endpoint devices 111-113 and/or 121-123, devices 131-134, server(s) 155, and so forth. In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a platform, a server, a system, and so forth, in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system. The method 300 begins in step 305 and proceeds to step 310.

At step 310, the processing system obtains at least one identifier of a customer at a first retail location of a telecommunication network service provider.

At optional step 315, the processing system may determine one or more account activity factors associated with the at least one identifier of the customer. For example, an account activity factor may comprise an indicator of whether or not an account activity has occurred within a predefined time period (e.g., a "third" predefined time period) prior to the customer being at the first retail location with respect to an account maintained by the telecommunication network service provider that is associated with the at least one identifier of the customer. For example, account activities may include adding a line to the account, porting a phone number to the account, upgrading a physical device associated with the account, adding a physical device associated with the account, removing an association of a physical device with the account, or adding an authorized user to the account. In one example, each account activity may have an associated account activity factor. In another example, an account activity factor may collectively track any of the above activities.

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," does not necessarily imply a particular number of those items corresponding to those numerical values. In addition, the use of the term "third" for example, does not imply a specific sequence or temporal relationship with respect to a "first" and/or a "second" of a particular type of item, unless otherwise indicated.

At optional step 320, the processing system may obtain third party information regarding the customer based upon the at least one identifier. The third party information may include a credit score. In one example, the third party information may alternatively or additionally comprise recency information regarding the at least one identifier.

At step 325, the processing system determines at least one recency factor of the at least one identifier. In one example, the at least one recency factor is determined from the third party information (e.g., recency information of the third party information), e.g., has a customer-provided email address been used in connection with retail transactions with other merchants within the last two months, what number of records are there in the third party information indicating that the customer-provided email address been used in connection with other transactions with merchants or other entities within the last year, how long ago was the email address created, how many times has a customer-provided phone number been provided in connection with other transactions with merchants or other entities within the past month, past three months, etc., and so forth. In another example, the at least one recency factor is determined from telecommunication network service provider originating data, such as from a customer account database indicating when an email address was created, when a telephone number was last assigned, when the at least one identifier was last used for a customer transaction (e.g., either online, in-store, or over-the-phone) with the telecommunication network service provider, and so forth.

At step 330, the processing system obtains an identification of one or more items of interest to the customer. For instance, the one or more items of interest to the customer may be input via a device at the first retail location of the telecommunication network service provider. For example, a retail associate may enter selections of the one or more items of interest via the device while assisting the customer. The one or more items of interest may comprise physical items, such as phones, phone cases, routers, tablet computers, laptop computers, etc., or service items, such as a new subscription or a subscription renewal, a type of subscription (e.g., prepaid, non-prepaid, etc.), an agreement duration (e.g., a one-year contract, a two-year contract, etc.), add-on services (such as additional data allowances, international calling plans, and so forth), discounts to be applied (such as free phone upgrades and/or subsidized phone upgrades, special group discounts, etc.), and so on.

At optional step 335, the processing system may obtain an indication of at least one predefined utterance provided by the customer at the first retail location. For instance, the indication may be obtained from a device at the retail location, where a retail associate may be provided with an interface having options to select possible utterances of customers that are considered to be indicative of fraud. For example, the at least one predefined utterance may be included in a list of one or more predefined utterances that are determined to be indicative of fraud.

At step 340, the processing system determines whether the customer has visited at least a second retail location of the telecommunication network service provider within a predefined time period (e.g., a "first" predefined time period) prior to the customer being at the first retail location. Notably, it is observed that customers shopping at multiple nearby stores in a short period of time is associated with fraudulent activity. In one example, step 360 may include determining a distance from the at least the second retail location to the first retail location and/or determining a time between the visit to at least the second retail location prior to the customer being at the first retail location.

At step 345, the processing system applies, to a fraud detection machine learning model, a plurality of factors e.g., comprising: a quantity, or number of the one or more items of interest, a total value of the one or more items of interest, a factor associated with whether the customer has visited at least the second retail location within the first predefined time period, and the recency factor of the at least one identifier of the customer, where the gradient boosted machine outputs a fraud indicator value. The factor associated with whether the customer has visited at least the second retail location within the first predefined time period may comprise, for example, a time of visiting the at least the second retail location prior to the customer being at the first retail location or a distance from the at least the second retail location to the first retail location. In one example, the fraud detection machine learning model may have inputs for both of these aspects as different factors (e.g., "geo-temporal factors").

In various example, the plurality of factors may further comprise a type (or types) of the at least one item of interest, a desirability factor (or factors) of the at least one item of interest, other cart size factors, and/or item value factors, and so on. With respect to the desirability factor, such a factor may comprise a ranking of the at least one item of interest for a number of completed customer transactions involving the at least one item of interest over a predefined time period (e.g., a "second" predefined time period) prior to the customer being at the first retail location as compared to other items of interest. In one example, the plurality of factors may include the account activity factor (or factors) that may be determined at optional step 315. Similarly, in one example, the plurality of factors may further comprise one or more third party factors in accordance with the third party information that may be obtained at optional step 320 (e.g., credit score information, etc.).

As discussed above, the fraud detection machine learning model may comprise a plurality of independent variables associated with the plurality of factors and a dependent variable comprising a fraud indicator value. In addition, the fraud detection machine learning model may be trained with a training data set comprising a plurality of sets of factors for a plurality of completed transactions between a plurality of customers and the telecommunication network service provider. For example, each of the plurality of sets of factors may be labeled with an indicator of one of: fraud or no fraud.

In one example, the fraud detection machine learning model comprises a gradient boosted machine (GBM). In various examples, the gradient boosted machine may have a tree depth of three to ten. In one example, the gradient boosted machine may be trained to comprise a predefined number of trees (e.g., between 10 and 200 trees, or more), or may be trained (e.g., additional trees added) until a predefined accuracy is obtained. In one example, the gradient boosted machine includes a regression tree implementation.

At step 350, the processing system determines that the fraud indicator value meets a warning threshold, e.g., 50 percent or greater likelihood of fraud, 70 percent or greater likelihood of fraud, etc. In the case of a binary classifier fraud detection machine learning model (e.g., a binary classifier GBM), the threshold may be concomitant with the output value of the fraud detection machine learning model. In other words, if the output/dependent variable is "fraud," then the threshold is met. It should be noted that "meeting" the warning threshold may also include exceeding the threshold.

At step 355, the processing system presents a warning to a device at the first retail location when it is determined that the fraud indicator value meets (and/or exceeds) the warning threshold. For example, the warning may instruct in-store personnel, such as a retail associate, to prevent a completion of a transaction between the customer and the telecommunication network service provider involving the one or more items. In one example, the processing system may apply a relatively low threshold (such as 51 percent likelihood) in order to generate a warning. For instance, in one example, the warning may instruct the retail associate via the device to direct the customer to a supervisor to apply an enhanced verification process. If the customer passes the enhanced verification process, the transaction may then be allowed to proceed, in which case, the telecommunication network service provider has simply spent a small amount of personnel and customer time to complete the additional verification. Otherwise, the transaction may continue to be prevented, thereby preventing an additional occurrence of fraud. Following step 355, the method 300 ends in step 395.

It should be noted that method 300 may be expanded to include additional steps, or may be modified to replace steps with different steps, to combine steps, to omit steps, to perform steps in a different order, and so forth. For instance, in one example, the processing system may repeat one or more steps of the method 300, such as steps 310-355 for additional customer transactions at a same or a different retail location. In one example, the method 300 may include training the fraud detection machine learning model in accordance with a training data set (e.g., groups/sets of input factors for completed in-store customer transactions, and for which labels have been applied). In one example, the method 300 may include retraining the fraud detection machine learning model, e.g., when a detected accuracy falls below a threshold accuracy, when the detected accuracy declines a certain percentage below an accuracy determined when the fraud detection machine learning model was deployed, etc. In one example, the method 300 may include obtaining information regarding changes to one or more criteria associated with one or more input factors, such as information regarding changes to the set of the three most popular mobile smartphones, changes to pricing information for various items, and so on. In addition, in such an example, the method 300 may additionally include retraining the fraud detection machine learning model, adjusting data filtering operations so as to correctly process telecommunication network service provider-sourced and/or third party-sourced data into input factors that are ready to be applied to the fraud detection machine learning model, and so on. Thus, these and other modifications are all contemplated within the scope of the present disclosure.

In addition, although not specifically specified, one or more steps, functions, or operations of the method 300 may include a storing, displaying, and/or outputting step as required for a particular application. In other words, any data, records, fields, and/or intermediate results discussed in the method 300 can be stored, displayed and/or outputted either on the device(s) executing the method 300, or to another device or devices, as required for a particular application. Furthermore, steps, blocks, functions, or operations in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the examples of the present disclosure.

Figure 4:
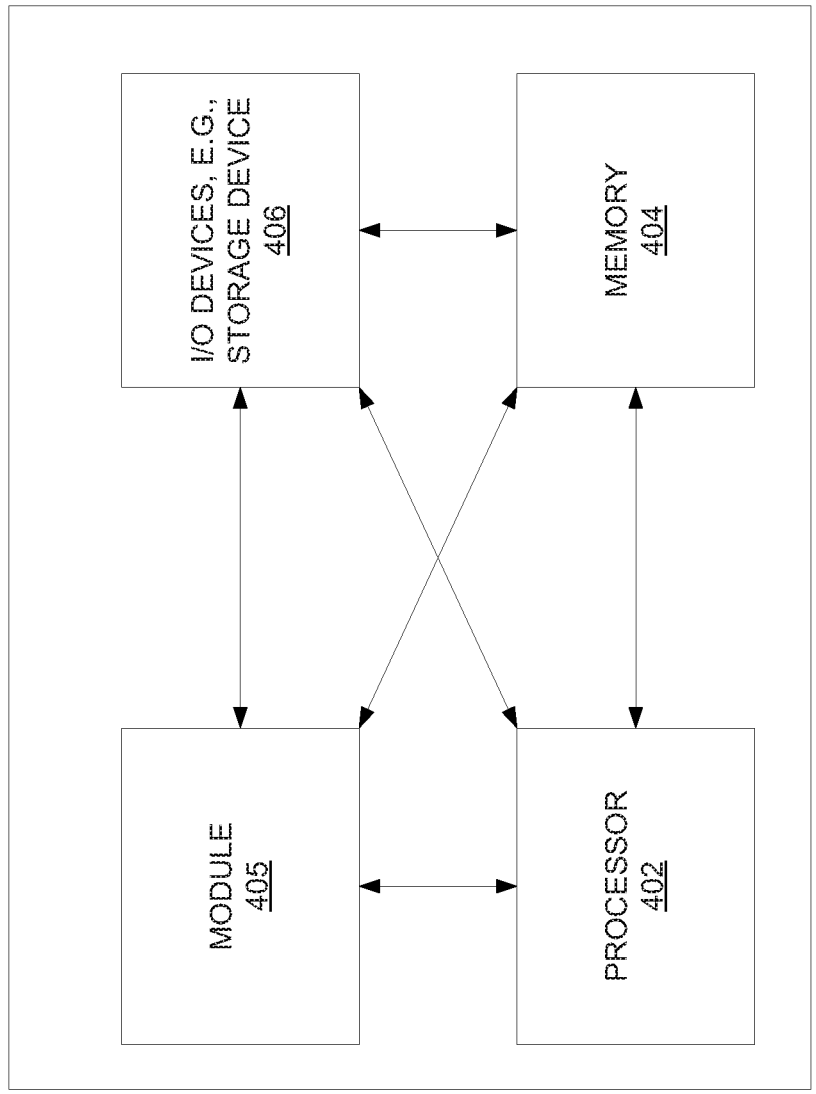
FIG. 4 illustrates a high-level block diagram of a computing device specially programmed to perform the functions described herein.

FIG. 4 depicts a high-level block diagram of a computing system 400 (e.g., a computing device, or processing system) specifically programmed to perform the functions described herein. For example, any one or more components or devices illustrated in FIG. 1, or described in connection with the process 200 of FIG. 2 or the method 300 of FIG. 3 may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where hardware processor element may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for presenting a warning when a fraud indicator value output from a fraud detection machine learning model that processes factors associated with a customer transaction at a retail location of a telecommunication service provider meets a warning threshold, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, it should be noted that the computing device may employ a plurality of hardware processor elements. Furthermore, although only one computing device is shown in FIG. 4, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 4 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for presenting a warning when a fraud indicator value output from a fraud detection machine learning model that processes factors associated with a customer transaction at a retail location of a telecommunication service provider meets a warning threshold (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s)

can be perceived as a programmed processor or a specialized processor. As such, the present module 405 for presenting a warning when a fraud indicator value output from a fraud detection machine learning model that processes factors associated with a customer transaction at a retail location of a telecommunication service provider meets a warning threshold (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   training, by a processing system including at least one processor, a fraud detection machine learning model implemented by the processing system, wherein the fraud detection machine learning model comprises a plurality of independent factors and a dependent variable comprising a fraud indicator, wherein the fraud detection machine learning model is trained with a training data set comprising sets of the independent factors for a plurality of completed transactions between a plurality of customers and a communication network service provider, wherein each of the sets of the independent factors is labeled with an indicator of one of: fraud or no fraud;
   obtaining, by the processing system, at least one identifier of a customer at a first retail location of the communication network service provider;
   determining, by the processing system, a recency factor of the at least one identifier;
   obtaining, by the processing system, an identification of one or more items of interest to the customer;
   determining, by the processing system, whether the customer has visited at least a second retail location of the communication network service provider within a first predefined time period prior to the customer being at the first retail location;
   applying, by the processing system, to the fraud detection machine learning model implemented by the processing system, a plurality of factors comprising: a number of the one or more items of interest, a total value of the one or more items of interest, a factor associated with whether the customer has visited at least the second retail location within the first predefined time period, and the recency factor of the at least one identifier of the customer, wherein the fraud detection machine learning model outputs a fraud indicator value of the fraud indicator;
   determining, by the processing system, that the fraud indicator value meets a warning threshold;
   presenting, by the processing system, a warning to a personnel device at the first retail location when it is determined that the fraud indicator value meets the warning threshold; and
   retraining, by the processing system, the fraud detection machine learning model when an accuracy of the fraud detection machine learning model declines below a threshold accuracy.

2. The method of claim 1, further comprising:
   obtaining third party information regarding the customer based upon the at least one identifier.

3. The method of claim 2, wherein the third party information includes a credit score.

4. The method of claim 2, wherein the plurality of factors further comprises the third party information.

5. The method of claim 2, wherein the recency factor is determined from the third party information.

6. The method of claim 1, wherein the fraud detection machine learning model comprises a gradient boosted machine.

7. The method of claim 6, wherein the gradient boosted machine has a tree depth of three to ten.

8. The method of claim 6, wherein the gradient boosted machine is trained to comprise a predefined number of trees or until a predefined accuracy is obtained.

9. The method of claim 1, wherein the plurality of factors further comprises a type of the one or more items of interest.

10. The method of claim 1, wherein the plurality of factors further comprises a desirability factor of the one or more items of interest, wherein the desirability factor comprises a ranking of the one or more items of interest for a number of completed customer transactions involving the one or more items of interest over a second predefined time period prior to the customer being at the first retail location as compared to other items of interest.

11. The method of claim 1, further comprising:
   determining an account activity factor associated with the at least one identifier of the customer, wherein the plurality of factors further includes the account activity factor.

12. The method of claim 11, wherein the account activity factor comprises an indicator of whether or not an account activity has occurred within a third predefined time period prior to the customer being at the first retail location with respect to an account maintained by the communication network service provider that is associated with the at least one identifier of the customer.

13. The method of claim 12, wherein the account activity comprises one of:
   adding a line to the account;
   porting a phone number to the account;
   upgrading a physical device associated with the account;
   adding a physical device associated with the account;
   removing an association of a physical device with the account; or
   adding an authorized user to the account.

14. The method of claim 1, further comprising:
   obtaining an indication of at least one predefined utterance provided by the customer at the first retail location.

15. The method of claim 14, wherein the plurality of factors further comprises the indication of the at least one predefined utterance.

16. The method of claim 14, wherein the at least one predefined utterance is included in a list of one or more predefined utterances that are determined to be indicative of fraud.

17. The method of claim 16, wherein the indication of the at least one predefined utterance is obtained via a personnel device at the first retail location.

18. A non-transitory computer-readable medium storing instructions which, when executed by a processing system including at least one processor, cause the processing system to perform operations, the operations comprising:
- training a fraud detection machine learning model implemented by the processing system, wherein the fraud detection machine learning model comprises a plurality of independent factors and a dependent variable comprising a fraud indicator, wherein the fraud detection machine learning model is trained with a training data set comprising sets of the independent factors for a plurality of completed transactions between a plurality of customers and a communication network service provider, wherein each of the sets of the independent factors is labeled with an indicator of one of: fraud or no fraud;
- obtaining at least one identifier of a customer at a first retail location of the communication network service provider;
- determining a recency factor of the at least one identifier;
- obtaining an identification of one or more items of interest to the customer;
- determining whether the customer has visited at least a second retail location of the communication network service provider within a first predefined time period prior to the customer being at the first retail location;
- applying, to the fraud detection machine learning model implemented by the processing system, a plurality of factors comprising: a number of the one or more items of interest, a total value of the one or more items of interest, a factor associated with whether the customer has visited at least the second retail location within the first predefined time period, and the recency factor of the at least one identifier of the customer, wherein the fraud detection machine learning model outputs a fraud indicator value of the fraud indicator;
- determining that the fraud indicator value meets a warning threshold; and
- presenting a warning to a personnel device at the first retail location when it is determined that the fraud indicator value meets the warning threshold; and
- retraining the fraud detection machine learning model when an accuracy of the fraud detection machine learning model declines below a threshold accuracy.

19. An apparatus comprising:
- a processing system including at least one processor; and
- a non-transitory computer-readable medium storing instructions which, when executed by the processing system, cause the processing system to perform operations, the operations comprising:
  - training a fraud detection machine learning model implemented by the processing system, wherein the fraud detection machine learning model comprises a plurality of independent factors and a dependent variable comprising a fraud indicator, wherein the fraud detection machine learning model is trained with a training data set comprising sets of the independent factors for a plurality of completed transactions between a plurality of customers and a communication network service provider, wherein each of the sets of the independent factors is labeled with an indicator of one of: fraud or no fraud;
  - obtaining at least one identifier of a customer at a first retail location of the communication network service provider;
  - determining a recency factor of the at least one identifier;
  - obtaining an identification of one or more items of interest to the customer;
  - determining whether the customer has visited at least a second retail location of the communication network service provider within a first predefined time period prior to the customer being at the first retail location;
  - applying, to the fraud detection machine learning model implemented by the processing system, a plurality of factors comprising: a number of the one or more items of interest, a total value of the one or more items of interest, a factor associated with whether the customer has visited at least the second retail location within the first predefined time period, and the recency factor of the at least one identifier of the customer, wherein the fraud detection machine learning model outputs a fraud indicator value of the fraud indicator;
  - determining that the fraud indicator value meets a warning threshold; and
  - presenting a warning to a personnel device at the first retail location when it is determined that the fraud indicator value meets the warning threshold; and
  - retraining the fraud detection machine learning model when an accuracy of the fraud detection machine learning model declines below a threshold accuracy.

20. The apparatus of claim 19, wherein the fraud detection machine learning model comprises a gradient boosted machine.

* * * * *